United States Patent
Choi

(10) Patent No.: US 7,953,553 B2
(45) Date of Patent: May 31, 2011

(54) NAVIGATOR AND METHOD FOR REDUCING CONSUMPTION CURRENT THEREOF

(75) Inventor: Sung Jun Choi, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 660 days.

(21) Appl. No.: 12/027,529

(22) Filed: Feb. 7, 2008

(65) Prior Publication Data

US 2008/0195318 A1    Aug. 14, 2008

(30) Foreign Application Priority Data

Feb. 12, 2007  (KR) .................... 10-2007-0014408

(51) Int. Cl.
    *G01S 5/02*  (2010.01)
(52) U.S. Cl. ............. 701/213; 342/357.63; 342/357.74
(58) Field of Classification Search .................. None
    See application file for complete search history.

(56) References Cited

U.S. PATENT DOCUMENTS

| | | | |
|---|---|---|---|
| 6,067,045 A * | 5/2000 | Castelloe et al. | 342/357.43 |
| 6,141,570 A * | 10/2000 | O'Neill et al. | 455/574 |
| 6,259,402 B1 * | 7/2001 | Asai | 342/357.74 |
| 6,438,381 B1 * | 8/2002 | Alberth et al. | 455/456.5 |
| 6,515,617 B1 * | 2/2003 | Demers et al. | 342/357.64 |
| 7,512,424 B2 * | 3/2009 | Hossain et al. | 455/574 |

FOREIGN PATENT DOCUMENTS

| | | |
|---|---|---|
| JP | 10-221427 | 8/1998 |
| KR | 1020020083747 | 11/2002 |
| KR | 1020040104414 | 12/2004 |
| KR | 20-0410174 | 2/2006 |

* cited by examiner

*Primary Examiner* — Michael J. Zanelli
(74) *Attorney, Agent, or Firm* — The Farrell Law Firm, P.C.

(57) ABSTRACT

Provided is a navigator, which reduces current consumption in a gap of an orbiting GPS satellite signal. A method for reducing the current consumption of the navigator is disclosed. The method includes measuring the strength of a geostationary GPS satellite signal; stopping the tracking of an orbiting GPS satellite signal when the measured geostationary GPS satellite signal strength is less than a critical value and such a state passes a preset time; performing a navigation mode where an orbiting GPS satellite signal and a geostationary GPS satellite signal are tracked when the measured geostationary GPS satellite signal strength exceeds the critical value. The navigator reads a gap of an orbiting GPS satellite signal using a geostationary GPS satellite signal and stops tracking the orbiting GPS satellite signal in the gap, thereby reducing its current consumption.

14 Claims, 4 Drawing Sheets

NAVIGATOR AND METHOD FOR REDUCING CONSUMPTION CURRENT THEREOF

PRIORITY

This application claims priority under 35 U.S.C. §119(a) to an application entitled "NAVIGATOR AND METHOD FOR REDUCING CONSUMPTION CURRENT THEREOF" filed in the Korean Intellectual Property Office on Feb. 12, 2007 and assigned Serial No. 2007-0014408, the contents of which are incorporated herein by reference.

BACKGROUND OF THE INVENTION

1. Field of the Invention

The present invention relates to satellite navigation technology, and more particularly, to a navigator that can reduce current consumption in a gap of an orbiting GPS satellite signal and a method for reducing the current consumption of navigator.

2. Description of the Related Art

In general, a Global Positioning System (GPS) is a satellite navigation system used for determining a GPS navigator's precise location using a GPS satellite signal from a GPS satellite, and is used in various fields, such in vehicles, vessels, and as navigation systems for airplanes, etc.

The GPS navigator receives an orbiting GPS satellite signal and calculates its current location. As well, the navigator must successively track the orbiting GPS satellite signal to perform a navigation mode where its current location is updated. Here, tracking the orbiting GPS satellite signal refers to a process in which the GPS navigator detects the GPS satellite signal to successively receive it.

After that, the GPS navigator extracts GPS data from the orbiting GPS satellite signal that was tracked and then calculates a pseudo distance using the extracted GPS data, thereby calculating its current location.

The following is a description of operations of the conventional GPS navigator with reference to FIG. 1.

As shown in FIG. 1, when a GPS navigator inputs power and thus drives the GPS signal-receiving unit, in Step S101, the GPS navigator tracks an orbiting GPS satellite signal using n channels described in following Table 1, in Step S103. Here, the n channels are allocated to the GPS navigator to track the GPS satellite signal.

TABLE 1

| ← | n channels assigned to orbiting GPS satellite signal | → |
|---|---|---|
| CH1(1) | CH1(2) | CH1(3) | ... | CH1(n-3) | CH1(n-2) | CH1(n-1) | CH1(n) |

After tracking, the GPS navigator measures the tracked orbiting GPS satellite signal strength, in Step S105.

Next, the GPS navigator makes a determination as to whether the measured signal strength exceeds a previously allocated critical value, in Step S107.

When the determination of Step S107 is negative, or the signal strength is less than the critical value, the procedure is returned to Step S103 to perform the following Steps thereof.

On the other hand, when the determination of Step S107 is positive, or the signal strength is greater than the critical value, the GPS navigator tracks the orbiting GPS satellite signal, in Step S109.

After that, the GPS navigator operates in a navigation mode where its current location is calculated based on the tracked orbiting GPS satellite signal, in Step S111.

Then, the GPS navigator determines as to whether a navigation termination request signal is input, in Step S113.

When the request signal is input in Step S113, the GPS navigator terminates its navigation operation. Otherwise, the procedure is returned to Step S103 and then the following Steps thereof are performed as described above.

As described above, the conventional GPS navigator performs signal tracking using the entire allocated channels at any location, even in a gap (for example, inside a building or tunnel) where it should not have performed such a tracking. Therefore, the conventional GPS navigator wastes current.

SUMMARY OF THE INVENTION

In order to solve the above problems, the present invention provides a navigator and method that stops the tracking of an orbiting GPS satellite signal in a gap of the orbiting GPS satellite signal, thereby reducing current consumption.

In accordance with an aspect of the present invention, there is provided a method for reducing current consumption of a Global Positioning System (GPS) navigator. The method includes measuring a strength of a geostationary GPS satellite signal; stopping the tracking of an orbiting GPS satellite signal when the measured geostationary GPS satellite signal strength is less than a critical value and such a state passes a preset time; and when the measured geostationary GPS is satellite signal strength exceeds the critical value, performing a navigation mode where an orbiting GPS satellite signal and a geostationary GPS satellite signal are tracked.

In accordance with another aspect of the present invention, there is provided a navigator that includes a GPS signal-receiving unit for tracking a geostationary GPS satellite signal and an orbiting GPS satellite signal using channels allocated for tracking the GPS satellite signals; a signal strength measurement unit for measuring a strength of the geostationary GPS satellite signal tracked by the GPS signal-receiving unit; and a controller for stopping the tracking of the orbiting GPS satellite signal when the measured geostationary GPS satellite signal strength is less than a critical value and such a state passes a preset time, and for performing a navigation mode where an orbiting GPS satellite signal and a geostationary GPS satellite signal are tracked when the measured geostationary GPS satellite signal strength exceeds the critical value.

BRIEF DESCRIPTION OF THE DRAWINGS

The above and other objects, features, and advantages of the present invention will be more apparent from the following detailed description in conjunction with the accompanying drawings, in which.

DETAILED DESCRIPTION OF PREFERRED EMBODIMENTS

The present invention relates to a navigator that measures the strength of a geostationary GPS satellite signal, determines whether its current location is in a cap of an orbiting GPS satellite signal, and stops tracking the orbiting GPS satellite signal in the gap, thereby reducing its current consumption. Also, the present invention relates to a method for reducing the current consumption of the navigator.

In the present application, "geostationary GPS satellite signal" refers to a GPS signal transmitted from a geostationary GPS satellite, and the orbiting GPS satellite signal refers to a GPS signal transmitted from an orbiting GPS satellite. As well, a GPS satellite signal is defined to include the geostationary GPS satellite signal and the orbiting GPS satellite signal.

Like the orbiting GPS satellite signal, the geostationary GPS satellite signal includes an ephemeris and an almanac of a satellite, and a GPS time. But a Pseudo-Random Number (PRN) is different from the geostationary GPS satellite signal and the orbiting GPS satellite signal. Therefore, only if software or firmware is changed in a particular way, can a general navigator calculate its current location using the two GPS satellite signals In the present invention, based on the strength of a geostationary GPS satellite signal transmitted from the geostationary GPS satellite, a determination is made as to whether the current location of a navigator is placed in a gap of an orbiting GPS satellite signal. Although there are many ways to measure the signal strength, such as a Received Signal Strength Indicator (RSSI) or a Signal-to-noise Ratio (SNR), the present invention employs an SNR of a geostationary GPS satellite signal to measure the signal strength. As well, when the measured SNR is less than a critical value and such a state passes a preset time, it is determined that the navigator is currently in a gap of a GPS satellite signal. Otherwise, when the SNR exceeds the critical value, it is determined that the navigator is in an area capable of receiving the GPS satellite signal.

The critical value is preferably allocated by a power masking level set in a GPS receiving chip included in a GPS signal-receiving unit. The power masking level is allocated to the general GPS navigators, respectively. The GPS navigator determines that a GPS signal is a reliable signal when an SNR of its received GPS signal exceeds a power masking level.

Hereinafter, embodiments of the present invention are described in detail with reference to the accompanying drawings.

Figure 1:
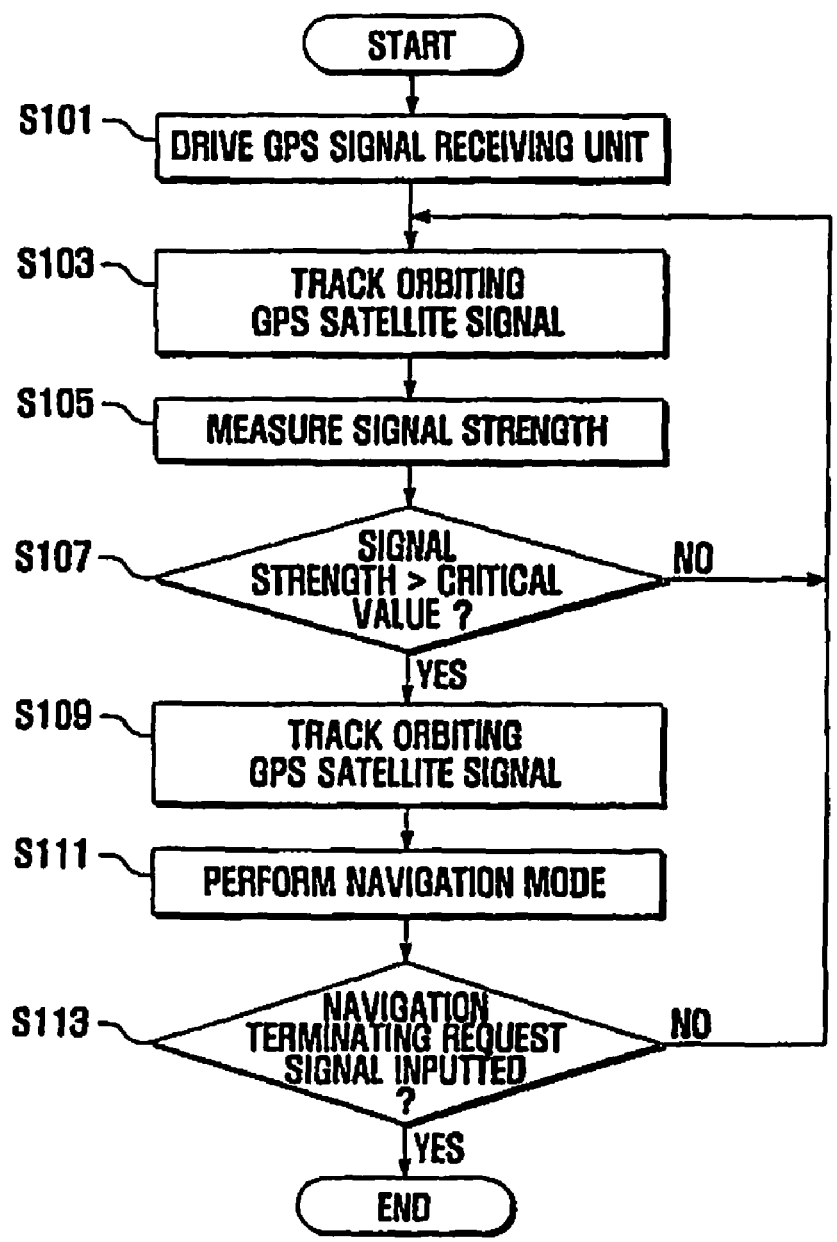
FIG. 1 is a flow chart describing a method of operating a conventional navigator.
Figure 2:
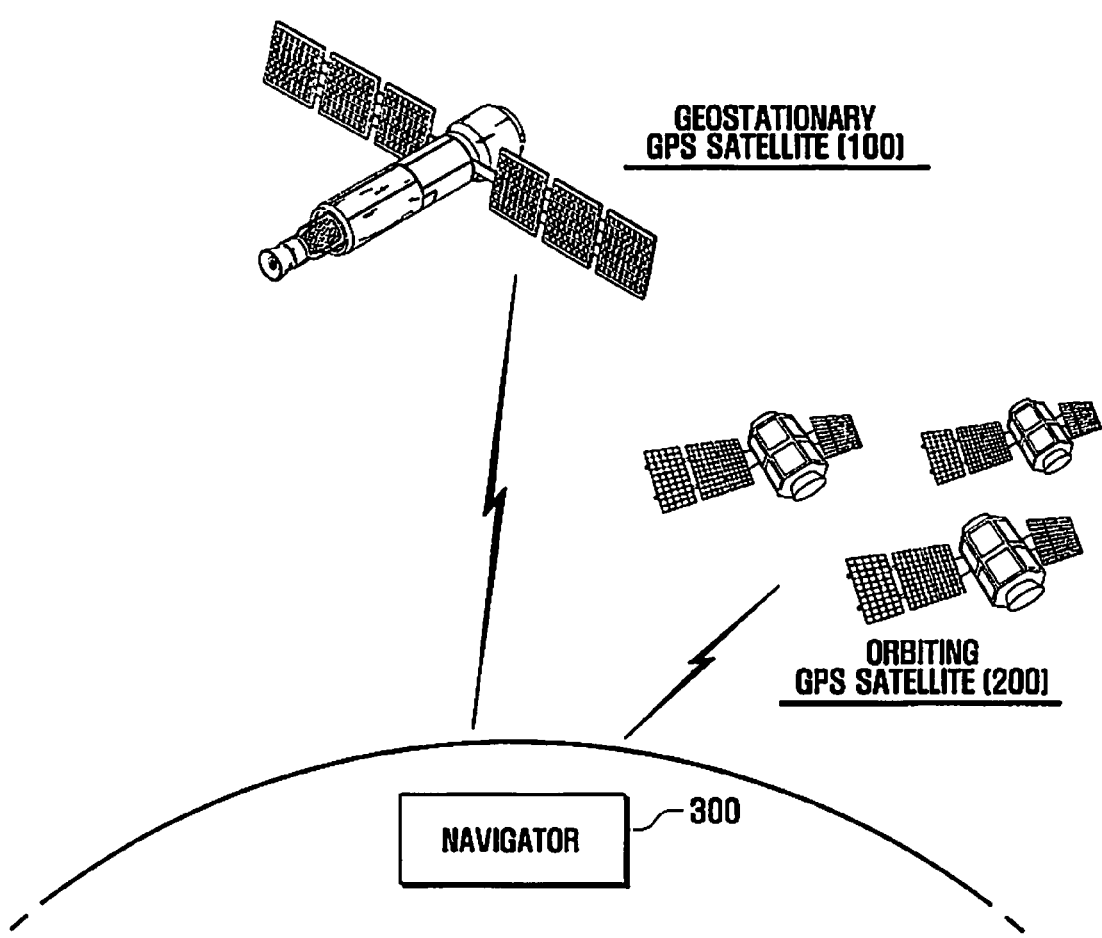
FIG. 2 illustrates a communication system with a navigator and a GPS satellite, according to the present invention.

FIG. 2 is a view illustrating a communication system with a navigator and a GPS satellite, according to the present invention.

Referring to FIG. 2, the system of the present invention includes a geostationary GPS satellite 100, an orbiting GPS satellite 200, and a navigator 300.

The geostationary GPS satellite 100 revolves around the earth at an altitude of approximately 35,786 km at the same rotation period as the earth, and thus is relatively stationary with respect to the earth, maintaining a high evaluation angle.

Since the geostationary GPS satellite 100 keeps a relatively high altitude, it can cover a relatively wide area of the earth. Also, since the geostationary GPS satellite is not affected by interference of building in a city, a signal-receiving rate is high. Therefore, the geostationary GPS satellites have been used for international communication and broadcasting as well as transmission of GPS signals. In addition, like the orbiting GPS satellite 200, the geostationary GPS satellite 100 transmits GPS satellite signals that the navigator needs to calculate its current location. Then, the navigator 300 performs a navigation mode, using the orbiting GPS satellite signal and the geostationary GPS satellite signal, in an area where a GPS satellite signal is receivable.

The geostationary GPS satellite 100 and the orbiting GPS satellite 200 emit GPS satellite signals, which include an ephemeris and an almanac of the satellite and a GPS time, so that the navigator 300 can calculate its location. Also, instead of the geostationary GPS satellite 100, the present invention receives GPS satellite signals using a Highly Elliptical Orbit (HEO) satellite, which locally revolves along a specific orbit and maintains a high evaluation angle, and a Quasi-Zenith Satellite System (QZSS).

The navigator 300 tracks a geostationary GPS satellite signal emitted from the geostationary GPS satellite 100 to measure strength of the tacked signal, and determines whether its current location is a gap of a GPS satellite signal. And, the navigator 300 tracks the GPS satellite signals, emitted from the orbiting GPS satellite 200 and geostationary GPS satellite 100, and performs a navigation mode to calculate its current location.

Figure 3:
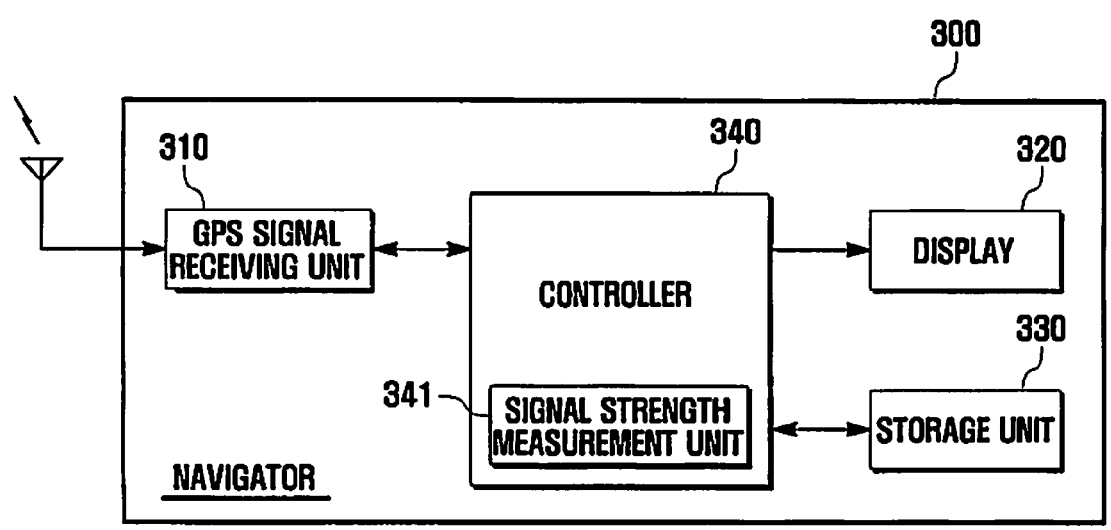
FIG. 3 is a schematic block diagram illustrating a navigator according to the present invention.

FIG. 3 is a schematic block diagram illustrating a navigator 300 according to the present invention.

Referring to FIGS. 2 and 3, the navigator 300 includes a GPS signal-receiving unit 310, a display 320, a storage unit 330, and a controller 340.

The GPS signal-receiving unit 310 is operated by the controller 340, and tracks a geostationary GPS satellite signal and orbiting GPS satellite signal to transmit them to the controller 340.

In particular, the GPS signal-receiving unit 310 having n channels allocates a number of channel (b channels) of the total n channels to the orbiting GPS satellite signal for tracking, and allocates the remaining m channels (m=n−b) to the geostationary GPS satellite signal for tracking.

For example, if 20 channels for tracking GPS satellite signal are allocated to the GPS signal-receiving unit 310, 16 channels are allocated to the orbiting GPS satellite signal and the remaining 4 channels are allocated to the geostationary GPS satellite signal, preferably.

The display 320 is implemented with a Liquid Crystal Display (LCD), etc., to display various display data and currently operating states of the navigator 300. In particular, according to present invention, the display 320 displays the current location of the navigator 300, under the control of the controller 340, in which the current location is calculated by the controller 340 in the navigation mode.

The storage unit 330 stores all programs and data that the navigator needs to operate. In particular, the storage unit 330 stores a critical value for a geostationary GPS satellite signal strength that the controller 340 uses to determine whether the current location of the navigator 300 is in a gap of a GPS signal. As well, the storage unit 330 stores the critical time for when the controller 340 is to stop tracking an orbiting GPS satellite signal according to the duration that the navigator 300 is placed in the gap.

The controller 340 controls the entire operation of the navigator 300. In particular, the controller 340 measures the strength of a geostationary GPS satellite signal, and stops tracking an orbiting GPS satellite signal when the measured geostationary GPS satellite signal strength is less than the critical value and such a state passes the critical time. On the other hand, when the measured geostationary GPS satellite signal strength exceeds the critical value, the controller 340 tracks an orbiting GPS satellite signal and geostationary GPS satellite signal to calculate the current location of the navigator 300.

To this end, the controller 340 may preferably include a signal strength measurement unit 341 for measuring strength (Signal-to-Noise Ratio) of the geostationary GPS satellite signal from the geostationary GPS satellite 100.

The controller 340 tracks the geostationary GPS satellite signal using the m channels and measures the tracked signal strength.

After that, the controller 340 compares the measured signal strength (SNR) with the critical value previously allocated.

When the signal strength exceeds the critical value, the controller 340 tracks an orbiting GPS satellite signal and a geostationary GPS satellite signal using b+m channels to perform a navigation mode and to measure the strength of a geostationary GPS satellite signal.

After that, the controller 340 calculates the current location of the navigator 300 using the tracked geostationary GPS satellite signal and the tracking information of the orbiting GPS satellite signal, and then performs the navigation mode. Such an operation can be performed because the controller 340 has determined that the navigator is in an area where it can receive GPS satellite signals. Then, the controller 340 repeatedly tracks the geostationary GPS satellite signal and measures the signal strength, using the m channels, to monitor whether the measured signal strength exceeds or falls below the critical value.

That is, the controller 340 tracks an orbiting GPS satellite signal and a geostationary GPS satellite signal using b+m channels to determine whether the navigator enters the navigation mode in an orbiting GPS satellite signal receivable area and the navigator is in a gap.

When the signal strength is less than the critical value, the controller 340 determines whether the navigator 300 is currently tracking an orbiting GPS satellite signal. If the navigator 300 is performing the tracking, the controller 340 stops tracking the orbiting GPS satellite signal using the b channels.

After that, the controller 340 allows the signal strength measurement unit 341 to measure the strength (SNR) of the tracked geostationary GPS satellite signal.

Then, the measured geostationary GPS satellite signal strength is compared with the critical value previously allocated. If the signal strength exceeds the critical value, the controller 340 resumes tracking an orbiting GPS satellite signal to maintain the navigation mode.

Before stopping tracking the orbiting GPS satellite signal, the controller 340 preferably stores the last received geostationary GPS satellite signal. It is preferable to perform such a storing operation because an initial operation time of the navigator can be reduced when the navigator is placed in a GPS signal receivable area, again.

Therefore, it is preferable that the controller 340 checks whether valid tracking information of an orbiting GPS satellite signal is stored in the storage unit 330 before starting tracking an orbiting GPS satellite signal, and then tracks the orbiting GPS satellite signal using the valid tracking information, if it exists. The controller 340 tracks GPS satellite signals using b+m channels while the navigation mode is performing, since the signal strength exceeds the critical value. On the other hand, m channels should be used while the navigation mode is suspended because the signal strength is less than the critical value.

Figure 4:
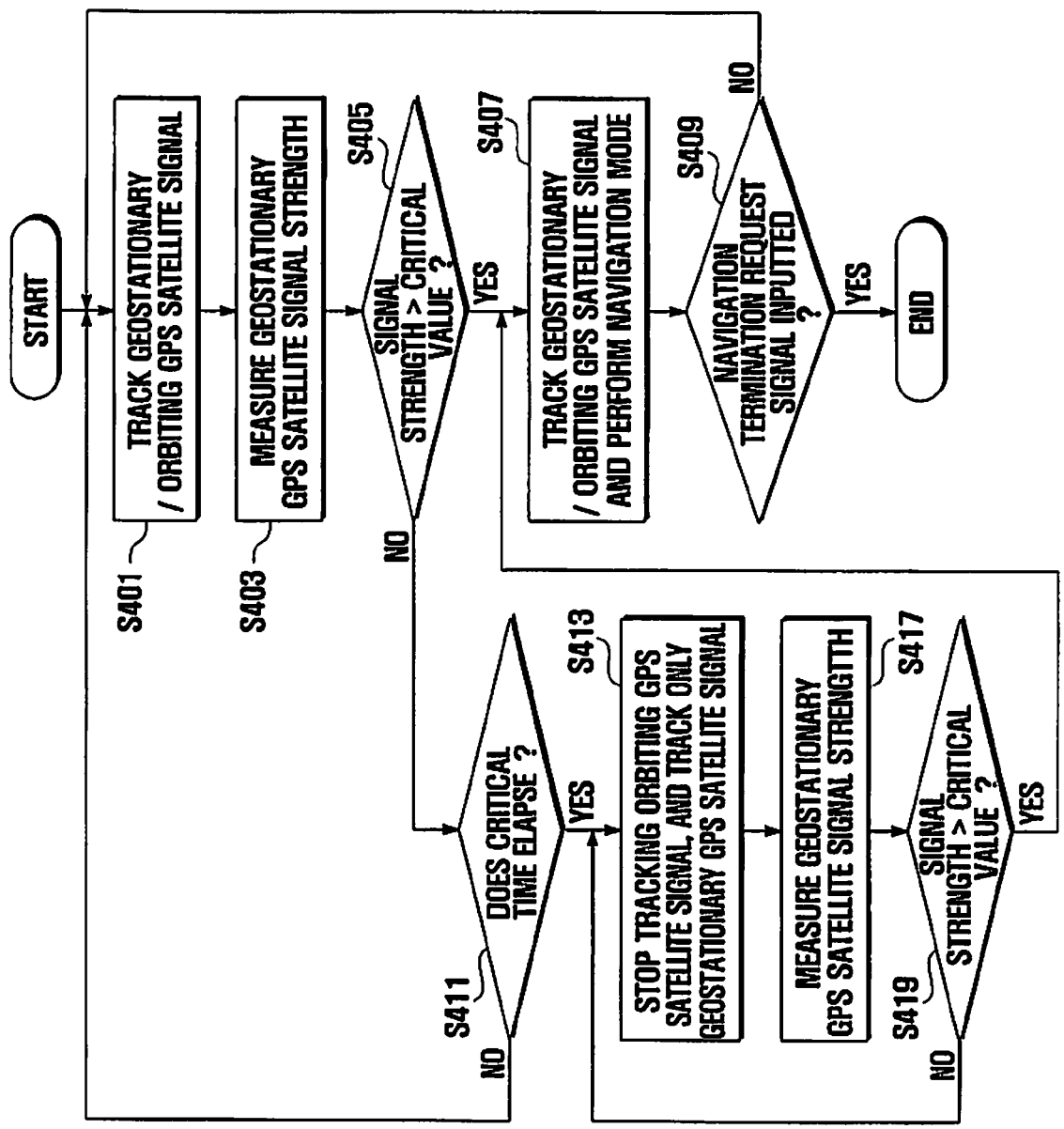
FIG. 4 is a flow chart describing a method for reducing current consumption when a navigator tracks a GPS signal, according to the present invention.

FIG. 4 is a method for reducing current consumption when a navigator tracks a GPS signal, according to the present invention.

When the navigator 300 is operated, the controller 340 allows the GPS signal-receiving unit 310 to track a geostationary GPS satellite signal and an orbiting GPS satellite signal, in Step S401.

The GPS signal-receiving unit 310 drives m channels for tracking the geostationary GPS satellite signal and b channels for tracking the orbiting GPS satellite signal.

The following Table 2 describes the total channels (n) for tracking GPS satellite signals a number of which are used to track only the orbiting GPS satellite signal, in which those channels are indicated as b. On the other hand, the number of remaining channels besides the b channels is m, which is used to track only the geostationary GPS s satellite signal.

Table 2

TABLE 2

| CH1(1) | CH1(2) | ... | CH1(a) | CH2(1) | CH2(2) | ... | CH2(m) |
|---|---|---|---|---|---|---|---| b channels allocated to orbiting GPS satellite signal ← CH1(1)...CH1(a)
m channels allocated to geostationary GPS satellite signal ← CH2(1)...CH2(m)

Here, n (total number of channels)=m+b.

For example, if the total channels for tracking GPS satellite signals is 20, 16 channels may be allocated to track the orbiting GPS satellite signal, and the remaining channels, 4 (=20−16), may be allocated to track the geostationary GPS satellite signal.

On the other hand, the controller 340 allows the signal strength measurement unit 341 to measure the strength of the geostationary GPS satellite signal, in Step S403, which is tracked in Step S401.

Although there are many ways to measure the signal strength, for example, a Received Signal Strength Indicator (RSSI) or a Signal-to-Noise Ratio (SNR), the present invention is described based on employing the SNR to measure the signal strength.

The controller 340 measures the SNR of the geostationary GPS satellite signal in Step S403 to determine whether the navigator 300 is currently placed in a gap of GPS satellite signals.

After that, the controller 340 determines whether the SNR measured in Step 403 exceeds the critical value previously set, in Step S405.

The critical value is preferably set to a power masking level allocated to the GPS signal-receiving unit 310. When the SNR of the received GPS satellite signal exceeds the power masking level, the navigator determines that the signal is reliable.

When the geostationary GPS satellite signal strength exceeds the critical value, the controller 340 maintains the tracking of the geostationary GPS satellite signal and orbiting GPS satellite signal and performs the navigation mode using the GPS signal-receiving unit 310, in Step S407.

Here, when the geostationary GPS satellite signal strength exceeds the critical value, the controller 340 determines that the navigator 300 is placed in an area where the reliable GPS satellite signals can be received to calculate its current location.

The controller 340 tracks the geostationary GPS satellite signal in Step S407 to determine whether the current location of the navigator 300 is a gap of GPS satellite signals and to receive the GPS satellite signals for performing the navigation mode.

Also, the controller 340 tracks the orbiting GPS satellite signal in Step S407 to receive GPS satellite signals for performing the navigation mode.

Although the controller 340 can perform such a navigation mode only using the geostationary GPS satellite signal, in that case, the current location of the navigator 300 cannot be precisely calculated.

On the other hand, since the geostationary GPS satellite 100 is located at relatively high altitudes, its evaluation angle is large. Therefore, the number of the geostationary GPS satellites is relatively smaller than that of the orbiting GPS satellites, and thus the number of geostationary GPS satellites located within the visibility range of the navigator is also relatively small. Therefore, if a navigator 300 calculates its current location only using geostationary GPS satellite signals from the few geostationary GPS satellites, the current location may create errors such that it is different from the real location, thereby decreasing its precision. To prevent such a problem, it is preferable to use the geostationary GPS satellite signal and orbiting GPS satellite signal when performing the navigation mode.

After that, the controller 340 determines whether a navigation termination request signal for requesting termination of the executing navigation mode is input by a user, in Step S409.

When the determination of Step S409 is positive, the controller 340 terminates the executing navigation mode. On the contrary, when the determination of Step S409 is negative, the controller 340 proceeds to Step S401. On the other hand, from the determination of Step S405, when the geostationary GPS satellite signal strength is less than the critical value, the controller 340 determines whether the state, in which the geostationary GPS satellite signal strength is less than the critical value (i.e., the duration that the navigator 300 is located in the gap), and passes a preset critical time, in Step S411. This operation determines how long the navigator is located in the gap.

When the state or duration does not exceed the critical time, the controller 340 proceeds to Step S401. This means that the controller 340 recognizes that the navigator 300 is located in the gap for a short time and then returns to a signal receivable area.

On the contrary, when the state or duration passes the critical time, the controller 340 stops tracking the orbiting GPS satellite signal and continues tracking only geostationary GPS satellite signal, in Step S413. This operation is performed because the navigator consumes current for tracking the orbiting GPS satellite signal while it is located in the gap and does not receive reliable GPS satellite signals. That is, the present invention is operated in such a way that the controller 340 turns off a tracking channels for the orbiting GPS satellite signals when the navigator is located in a gap of GPS satellite signals, thereby reducing current consumption for the b channels, although the conventional navigator consumes the current.

After that, the controller 340 measures the strength of the geostationary GPS satellite signal, in Step S417.

Then, the controller 340 determines whether the measured geostationary GPS satellite signal strength of Step S417 exceeds the critical value, in Step S419.

When the determination of S419 is positive, or the signal strength exceeds the critical value, the controller proceeds to Step S407 and performs the following Steps thereof. Here, the controller 340 enters the navigation mode, using the geostationary GPS satellite signal tracked in Step S413, and then further tracks an orbiting GPS satellite signal to enter the navigation mode.

When the determination of S419 is negative, or the signal strength does not exceed the critical value, the controller 340 proceeds to Step S413 and to tracks a geostationary GPS satellite signal, and performs the following Steps thereof.

That is, the conventional navigator always uses all the b+m channels to track an orbiting GPS satellite signal, regardless of a gap of GPS satellite signals and a GPS satellite signal receivable area. On the contrary, the navigator according to the present invention is operated in such a way that it uses b+m channels in the GPS satellite signal receivable area and only m channels in a gap of GPS satellite signals. That is, the navigator of the present invention can reduce current consumption corresponding to the b channels in the gap, compared to the conventional navigator.

As described in the foregoing, the navigator of the present invention reads a gap of an orbiting GPS satellite signal using a geostationary GPS satellite signal and stops tracking the orbiting GPS satellite signal in the gap, thereby reducing its current consumption. While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A method for reducing current consumption of a Global Positioning System (GPS) navigator, comprising:
   tracking an orbiting GPS satellite signal;
   measuring the strength of a geostationary GPS satellite signal; and
   stopping the tracking of the orbiting GPS satellite signal when a state of the measured geostationary GPS satellite signal strength is less than a critical value and such a state passes a preset time.

2. The method of claim 1, further comprising:
   performing a navigation mode where the orbiting GPS satellite signal and the geostationary GPS satellite signal are tracked when the measured geostationary GPS satellite signal strength exceeds the critical value.

3. The method of claim 2, wherein the navigation mode allows the GPS navigator to successively track the orbiting GPS satellite signal and the geostationary GPS satellite signal, update a current location, and display the updated result.

4. The method of claim 1, further comprising:
   tracking the geostationary GPS satellite signal;
   measuring the strength of the tracked geostationary GPS satellite signal; and
   additionally, when the measured geostationary GPS satellite signal strength is less than the critical value, tracking the geostationary GPS satellite signal.

5. The method of claim 1, wherein the orbiting GPS satellite signal and the geostationary GPS satellite signal comprise an ephemeris and an almanac of the GPS satellites, and further comprise a GPS time.

6. The method of claim 1, wherein the orbiting GPS satellite signal is used for a tracking using a number of channels allocated to track the orbiting GPS satellite signal.

7. The method of claim 1, wherein the geostationary GPS satellite signal is used for tracking using a number of channels allocated to track the GPS satellite signal, in which the channels for tracking the geostationary GPS satellite signal is the remaining channels, besides the channels used to track the orbiting GPS satellite signal.

8. A navigator comprising:
   a GPS signal-receiving unit for tracking a geostationary GPS satellite signal and an orbiting GPS satellite signal using channels allocated for tracking GPS satellite signals;

a signal strength measurement unit for measuring strength of the geostationary GPS satellite signal tracked by the GPS signal-receiving unit; and a controller for stopping the tracking of the orbiting GPS satellite signal when the state of the measured geostationary GPS satellite signal strength is less than a critical value and such a state elapses a preset time, and for performing a navigation mode where the orbiting GPS satellite signal and the geostationary GPS satellite signal are tracked when the measured geostationary GPS satellite signal strength exceeds the critical value.

9. The navigator of claim 8, wherein the orbiting GPS satellite signal and the geostationary GPS satellite signal comprise an ephemeris and an almanac of the GPS satellites, and a GPS time.

10. The navigator of claim 8, wherein the controller tracks the geostationary GPS satellite signal to measure strength of the tracked geostationary GPS satellite signal after the tracking has stopped, and when the measured geostationary GPS Satellite signal strength is less than the critical value, tracks the geostationary GPS satellite signal.

11. The navigator of claim 8, wherein the navigation mode allows the navigator to successively track the orbiting GPS satellite signal and the geostationary GPS satellite signal, update a current location, and display the updated result.

12. The navigator of claim 8, wherein the signal strength measurement unit measures a signal received through a tracking channel of a geostationary GPS satellite, which was previously allocated.

13. The navigator of claim 8, wherein the orbiting GPS satellite signal is used for tracking using a number of channels allocated to track the orbiting GPS satellite signal.

14. The navigator of claim 8, wherein the orbiting GPS satellite signal is used for tracking using a number of channels allocated to track the orbiting GPS satellite signal, in which the channels for tracking the geostationary GPS satellite signal are the remaining channels, besides the channels used to track the orbiting GPS satellite signal.

* * * * *